United States Patent [19]

Weber et al.

[11] 4,403,177
[45] Sep. 6, 1983

[54] BRUSHLESS THREE PHASE DIRECT CURRENT MOTOR CONTROL CIRCUIT

[75] Inventors: Howard F. Weber, Scottsdale, Ariz.; Jack R. Morgan, West Bloomfield, Mich.

[73] Assignee: Motorola, Inc., Schaumburg, Ill.

[21] Appl. No.: 293,811

[22] Filed: Aug. 17, 1981

[51] Int. Cl.³ .............................................. H02K 29/00
[52] U.S. Cl. ................................... 318/254; 318/138; 318/685; 318/696
[58] Field of Search ........................ 318/138, 254, 696

[56] References Cited

U.S. PATENT DOCUMENTS 3,997,823 12/1976 Machida ............................... 318/138
4,250,435 2/1981 Alley et al. .......................... 318/138
4,262,236 4/1981 Gelenius et al. ..................... 318/138

Primary Examiner—J. V. Truhe
Assistant Examiner—Saul M. Bergmann
Attorney, Agent, or Firm—Michael D. Bingham

[57] ABSTRACT

A driver circuit is coupled to the stator windings of a brushless three phase DC motor which is responsive to the open circuit back EMF voltage induced in the next stator winding to be energized as a permanent magnet rotor of the motor is caused to be rotated for producing phase current drive to the stator winding in synchronous with the operation of the motor. The driver circuit includes an increment drive circuit for supplying periodic switching command signals in succession to a switching circuit to produce phase current drive in each stator. The increment drive circuit increments a switch command signal to cause phase current through the next phase stator winding in reference to the magnitude of the EMF voltage induced across said phase stator winding falling below a reference level. A feature of the invention is that the frequency of the periodic switch command signals is varied during starting of the motor dependent on the magnitude of starting potential supplied to the driver circuit to prevent the motor from "locking" which would otherwise inhibit start thereof.

9 Claims, 4 Drawing Figures

BRUSHLESS THREE PHASE DIRECT CURRENT MOTOR CONTROL CIRCUIT

BACKGROUND OF THE INVENTION

This invention relates to brushless direct current (DC) three phase motors and, more particularly, to a start-to-run control circuit for driving the motor.

In an attempt to meet today's stringent automobile pollution standards as set by the government and further to increase fuel efficiency, the automobile industry is relying more and more on the use of fuel injected engines. To acceptably supply the fuel to the injectors of these fuel injection driven engines requires a fuel pump that pumps fuel in sufficient force to the injectors rather than the standard vacuum pump which draws fuel from the fuel tank to the injectors. At least one automobile manufacturer is including the fuel pump within the automobile fuel tank.

A brush-type DC motor with copper commutators is not suited for application within the fuel tank for the following reasons. The brush-type motor if placed in the fuel tank is subject to fuel contamination, generation of peroxides, high commutator wear rates and possible ignition of the combustible mixtures. Therefore, to overcome the disadvantages of the brush-type DC motor a brushless three phase DC motor is contemplated.

In order to properly operate the brushless DC motor it is necessary to have a control drive circuit to provide the necessary switching to the stator windings of the three phase stator so that a permanent magnet rotor, under the influence of the stator, will produce the speed/torque characteristics of a brush-type motor.

Thus, there is a need for a control circuit to produce both start and run modes of operation for operating the brushless three phase motor while providing variable starting frequency and speed dependent on the magnitude of the operating potential supplied to the circuit.

SUMMARY OF THE INVENTION

Accordingly, it is an object of the present invention to provide an improved control circuit for a brushless DC motor which provides synchronous drive current succession to the stator windings of the motor.

Another object of the present invention is to provide an improved control circuit for a brushless DC motor including a start-to-run circuit which converts the control circuit from a start-mode to a run-mode of operation in synchronism with the operation of the motor.

Still another object of the present invention is to provide an improved control circuit for operating a DC brushless motor which has a variable starting frequency dependent on the magnitude of an operating potential supplied to the circuit.

A further object of the present invention is to provide a control circuit for supplying synchronous current drive to the stator windings to the operation of the DC brushless motor which includes delay circuitry for inhibiting current drive in the particular stator winding for a predetermined time delay after the magnitude of the current therethrough reaches a predetermined value.

In accordance with the above and other objects there is provided a control circuit having a variable starting frequency dependent on the magnitude of starting operating potential supplied thereto for starting a brushless DC motor and then providing synchronous current drive in succession to each stator winding of the motor to operate the motor in a running mode of operation. The control circuit includes an increment drive circuit which is responsive to trigger signals supplied thereto for providing incremental switching signals in synchronism with the operation of the motor to control a switching circuit that causes drive current to be established in each stator winding in succession. A feedback circuit is coupled between the individual stator windings and the outputs of the increment drive circuit which is responsive both to the sequential signals and the EMF voltages appearing across the individual stator windings to enable a trigger circuit that in turn provides trigger signals to the increment drive circuit such that drive current is initiated through the next stator winding in response to the switching signals produced in time relation to the rotor rotation to maintain the operation of the motor.

A feature of the invention is that a delay circuit is included which is responsive to the magnitude of the current reaching a predetermined value in each stator winding for reducing the current to substantially zero for a predetermined time delay to reduce power dissipation in the stator winding and switching circuit.

Another feature of the invention is that the control circuit includes circuitry responsive to the magnitude of the operating potential that is supplied to the control circuit during starting of the motor to very the starting frequency of the switching signals to insure that the motor is always started.

DESCRIPTION OF THE PREFERRED EMBODIMENT

Figure 1:
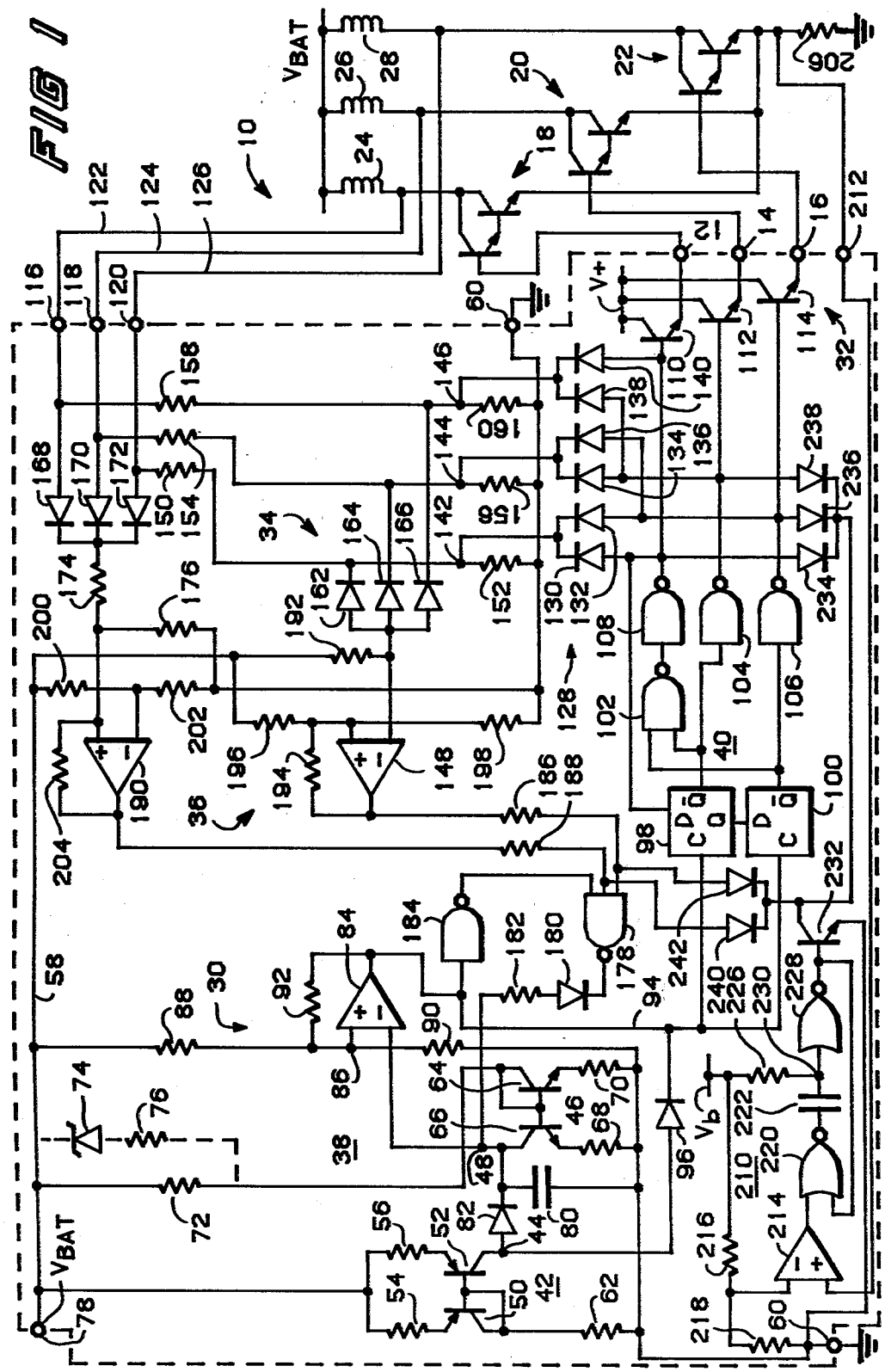
FIG. 1 is a schematic diagram illustrating the brushless motor control circuit of the present invention.
Figure 4:
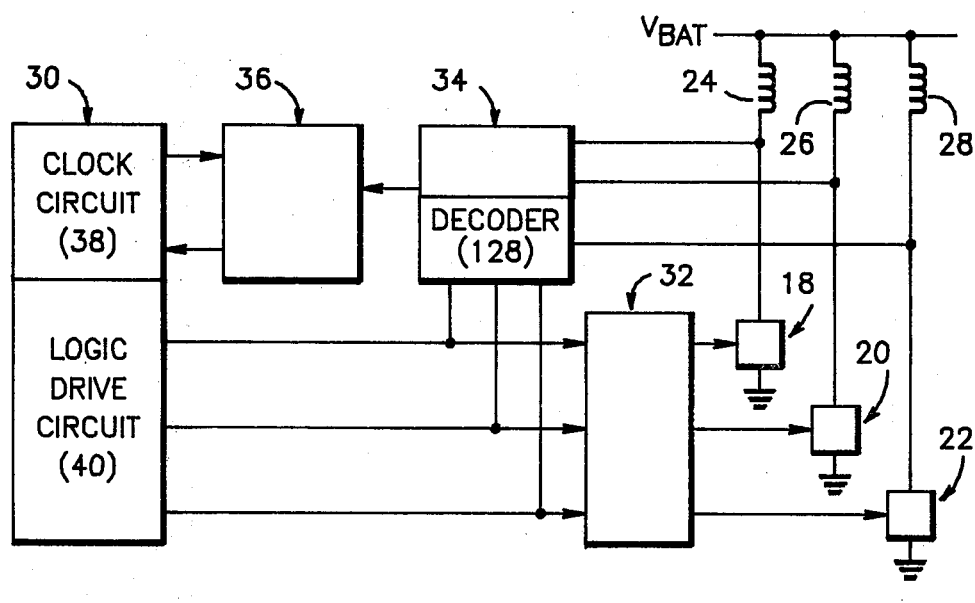
FIG. 4 is a simplified block diagram of the control circuit of FIG. 1.

Turning to FIGS. 1 and 4, there is shown control circuit 10 of the present invention which is suitable to be fabricated in monolithic integrated circuit form as indicated by the dashed outline. As will be hereinafter explained, control circuit 10 is suited for providing periodic or cyclical, sequential signals at output terminals 12, 14, and 16 to render NPN Darlington power transistors 18, 20, and 22 conductive in succession. If, for example, transistors 18, 20, and 22 are connected in series with the stator windings 24, 26, and 28 of a three phase direct current (DC) motor, proper phase current drive is supplied thereto to cause rotation of a permanent magnet rotor of the motor to provide mechanical drive therefrom as is understood. The motor can be utilized to drive any of several types of devices, for instance, a fuel pump could be operated by the motor that would pump fuel to individual fuel injectors of an internal combustion engine. Hence, control circuit 10, in this application, would be utilized to insure that the next phase stator winding current drive is implemented to insure continuous running of the fuel pump motor.

Briefly described, control circuit 10 comprises increment drive circuit 30 which during normal operation produces the periodic and sequential switching signals at respective outputs thereof to switching circuit 32. Each sequential switching signal produces current drive to the proper stator winding of the three phase DC motor. A feedback circuit 34 is employed between increment drive circuit 30 and each individual stator winding 24, 26, and 28 to enable a trigger circuit 36 as the induced back EMF voltage across the next stator winding to be energized reaches a predetermined value. As trigger circuit 36 is enabled, a clock pulse is generated in increment drive circuit 30 to increment current drive to the next phase of the motor. As is understood, stator windings 24, 26 and 28 are placed 120 electrical degrees with respect to each other.

As shown, increment drive circuit 30 comprises a clock pulse producing circuit 38 and logic drive circuit 40. Clock circuit 38 includes a first current source 42 for sourcing a current $I_C$ of substantially constant magnitude to node 44 and a second current source 46 for sinking a current $I_D$ of substantially constant magnitude from node 48. Current source 42 comprises PNP transistors 50 and 52 connected as a well-known current mirror with emitters thereof commonly connected via resistors 54 and 56 to power supply conductor 58. The collector of diode connected transistor 50 is returned to terminal 60 at which is supplied ground reference potential via resistor 62. Diode connected NPN transistor 64 and NPN transistor 66 are connected as a current mirror to form current source 46. The collector of transistor 66 is coupled to node 48 with the emitter thereof being returned to terminal 60 through resistor 68. The emitter of transistor 64 is returned, via resistor 70 to terminal 60. The collector of transistor 64 is returned to power supply conductor 58 through resistor 72. A series connected Zener diode 74 and resistor 76 are coupled in parallel with resistor 72 to provide a variable starting frequency dependent on the potential $V_{BAT}$ supplied to terminal 78. A capacitor 80 which is charged and discharged during operation of control circuit 10 is connected between nodes 48 and terminal 60. Diode 82 is provided between nodes 44 and 48 such that capacitor 80 is charged when the diode is forward biased. Comparator 84 having an inverting input connected to node 48 and a non-inverting input coupled at node 86 between series resistors 88 and 90 and to resistor 92, the other end of which is connected to the output of the comparator, is responsive to the charging and discharging of capacitor 80 to produce a clock pulse at the output thereof via lead 94 to the input of logic drive circuit 40. A diode 96 is shown connected between node 44 and the output of comparator 84.

Logic drive circuit 40 includes a pair of flip-flops 98 and 100 the clock inputs of which are connected to the output of comparator 84. The Q and Q outputs of flip-flop 98 are connected respectfully to the data input of flip-flop 100 and to an input of NAND gate 102 and NAND gate 104. The Q output of flip-flop 100 is connected both to a second input of NAND gate 102 and to NAND gate 106. The output of NAND gate 102 is coupled to the input of NAND gate 108 the output of which is returned to the data input of flip-flop 98. Logic circuit 40 is essentially a divide by three counter wherein periodic signals appear at the outputs of NAND gates 108, 104, and 106 in sequence in response to every third clocking signal that is applied to the inputs of the logic circuit. NPN transistors 110, 112, and 114 of switching circuit 32, which have the base electrodes thereof coupled to the respectively outputs of NAND gates 108, 104, and 106, are sequentially rendered conductive as the output of the respective NAND gates are periodically clocked high. As each transistor is sequentially rendered conductive, base current drive is supplied through the collector-emitter path of the respectively transistor 110, 112, or 114 to output terminal 12, 14 or 16 to turn on the corresponding Darlington transistors that are connected thereto.

A feedback path is provided from each of the three phase stator windings to respective feedback input terminals 116, 118, and 120 of control circuit 10 via leads 122, 124, and 126. Feedback circuit 34 is responsive to the feedback signals occurring over leads 122, 124, and 126 to enable trigger circuit 36. Feedback circuit 34 includes a full decoder circuit 128 comprising a plurality of diodes 130, 132, 134, 136, 138, and 140 interconnected between nodes 142, 144, and 146 to the outputs of NAND gates 108, 104, and 106. Decoder circuit 128 selectively enables run-trigger comparator 148 in conjunction with the feedback signals that appear across series connected resistors 150, 152; 154, 156; and 158, 160. Diodes 162, 164, and 166 which comprise a diode circuit are connected between terminals 142, 144, and 146 to the inverting input of comparator 148. The back EMF feedback signals applied at terminals 116, 118, and 120 are also supplied to respective diodes 168, 170 and 172 the cathodes of which are commonly connected to resistor 174 which forms in conjunction with resistor 176 a resistive divider network that is connected to the non-inverting input of comparator 190.

Trigger circuit 36 includes NAND gate 178 the output of which is coupled through diode 180 and resistor 182 to node 48 of the increment drive circuit 30. NAND gate 178 has three inputs, the first of which is coupled to the output of NAND gate 184 that has its input coupled to the output of comparator 84 such that the output of comparator 84 is coupled to one input of NAND gate 178. The second and third inputs of NAND gate 178 are coupled via resistors 186 and 188 respectively to the outputs of run trigger comparator 148 and start-to-run trigger comparator 190. The inverting input of comparator 148 besides being coupled to the anodes of diodes 162, 164, and 166 is returned through resistor 192 to power supply conductor 58. The non-inverting input of comparator 148 is connected both via resistor 194 to the output thereof and to the interconnection between series connected resistors 196 and 198 which are in turn connected between power supply conductor 58 and terminal 60. Similarly, the inverting input of start-to-run comparator 190 of trigger circuit 36 is connected to the interconnection of series connected resistors 200 and 202 such that this input is biased at a reference potential.

START MODE OF OPERATION

Figure 2:
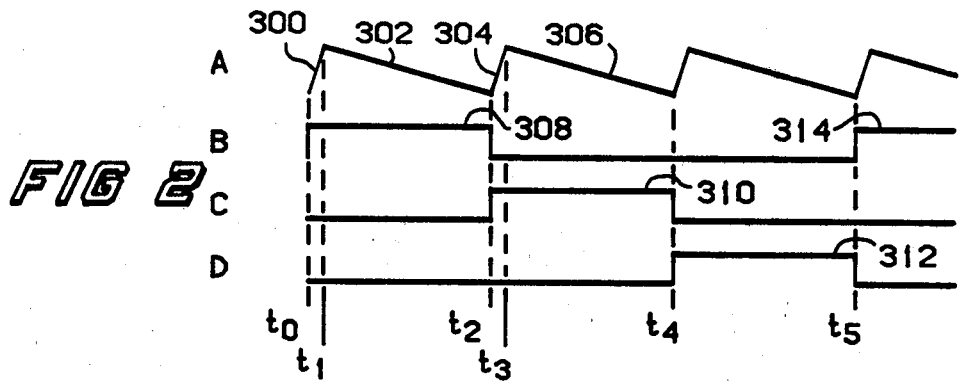
FIG. 2 illustrates waveforms useful for understanding the operation of the control circuit of FIG. 1 during the start mode of operation.

With reference to FIGS. 1 and 2, the operation of control circuit 10 for controlling the starting of a DC brushless, three phase motor that includes the three phase stator windings 24, 26, and 28 is now explained. Before and during the initial starting of the motor there is no or very little induced back EMF voltages across the stator windings. Therefore, diodes 168, 170, and 172 are reverse biased to cause the potential at the non-inverting input of start-to-run comparator 190 to be less than the potential appearing at the inverting input thereof. Hence, the output of comparator 190 is low. This condition places a logic zero at one input of NAND gate 178 thereby disabling the gate. In this condition diode 180 is reverse biased. Therefore, with both current sources 42 and 46 conductive capacitor 80 is caused to be charged beginning at time $t_0$ (FIG. 2) at a rate proportional to the difference of the two currents ($I_C - I_D$) as illustrated by waveform portion 300 of FIG. 2A. Because the potential across capacitor 80 is initially less than the potential appearing at node 86 the output of comparator 84 is forced high to produce a clock pulse via lead 94, to the input of logic drive circuit 40. In addition, diode 96 is reverse biased and resistors 88 and 92 are placed in parallel with respect to one another. Hence, capacitor 80 will continue to be charged until the potential thereacross reaches an upper theshold level $\frac{2}{3} V_{BAT}$, at time $t_1$, which then causes the output of comparator 84 to go low. As the output of comparator 84 goes low diode 96 is forward biased to sink all of the current $I_C$ from node 44. Capacitor 80 is therefore caused to be discharged at a rate proportional to $I_D$, waveform portion 302. Resistors 90 and 92 are placed in parallel to each other due to the output of comparator 84 being low such that the capacitor is discharged to a lower threshold level $\frac{1}{3} V_{BAT}$ at time $t_2$. As the potential across capacitor 80 reaches the lower threshold potential the output of the comparator is forced high thereby reverse biasing diode 96 to once again allow charging of the capacitor, waveform portion 304, FIG. 2A. Consequently, another clock pulse is supplied to the input of logic circuit 40. At time $t_3$, the output of comparator 84 is forced low as the potential across capacitor 80 has reached the upper threshold level to cause discharging of the capacitor as illustrated by waveform portion 306 until time $t_4$ when the cycle is again repeated. Thus, as described, periodic clock pulses are supplied via lead 94 to the clock inputs of flip-flops 98 and 100 at times $t_0$, $t_2$, $t_4$, etc.

For discussion purposes it is assumed that as power is supplied to control circuit 10 the Q outputs of flip-flops 98 and 100 go to a logic one output level state. Thus, at time $t_0$, in response to the first clock pulse supplied at the output of comparator 84, a first switching drive signal 308, FIG. 2B, is produced that is applied to the base of transistor 110. Similarly, in response to the next clock pulse a second switching drive signal 310, FIG. 2C, is sequentially produced at the output of NAND gate 104 to the base of transistor 112. A third switching drive signal 312, FIG. 2C, is sequentially produced at the output of NAND gate 106 at time $t_4$. At time $t_5$, the cycle repeats causing another switching drive signal 314 to be produced at the output of NAND gate 108. Thus, during the start mode of operation, transistors 110, 112, and 114 are periodically and sequentially rendered conductive to render, corresponding Darlington transistors 18, 20, and 22 conductive. Therefore, current drive is supplied in sequence through the three phase stator windings 24, 26, and 28 through the Darlington transistors and through resistor 206 to ground potential.

As current drive is supplied in succession through the three stator windings, the permanent magnet rotor is caused to rotate toward the particular stator winding that is energized by current drive therethrough. This produces an induced back EMF voltage, through the other two windings. As the rotor is rotated and the induced voltages across the stator windings increase, a point is reached at which transitioning from the start mode to the run mode of operation occurs as will be later explained.

One feature of the present invention is that, depending on the magnitude of the starting voltage supplied at input terminal 78, the frequency of the clock pulses generated at the output of comparator 84 are varied. Hence, if the supply voltage $V_{BAT}$ is less than the Zener breakdown voltage of diode 74, resistor 76 only is in series with the collector of transistor 64. This causes a magnitude of the current $I_D$ to be less than when the magnitude of the power supply voltage exceeds the Zener breakdown voltage of the diode. Thus, at low supply voltages, each clock pulse time period is increased. This non-linear starting frequency allows a lower drive peak current through the particular stator winding that is to be energized. Therefore, at lower starting voltages, the longer pulse periods correspond to lower available torque and slower rotor speeds of aceleration. This allows a much greater range of "assured" starts under motor load conditions.

START-TO-RUN MODE OF OPERATION

As previously described, during starting of the motor the open circuit phase voltage induced across each phase winding is insufficient to forward bias either of the diodes 168, 170, 172 whereby the output of start-to-run comparator 190 is forced low to disable gate 178. Hence, clock pulses are generated at the output of comparator 84 to produce the sequential current drive through the stator windings independent to the rotor movement, i.e., the clock pulses are generated in response to the charge and discharge of capacitor 80 between the upper and lower threshold levels. However, after the starting mode initiates the condition necessary for the running mode of operation, it is necessary to transition the charge and discharge of capacitor 80 so that the current drive supplied to the individual phase windings are in sync with rotation of the rotor whereby the next phase winding to be energized is incremented at the correct phase.

Figure 3:
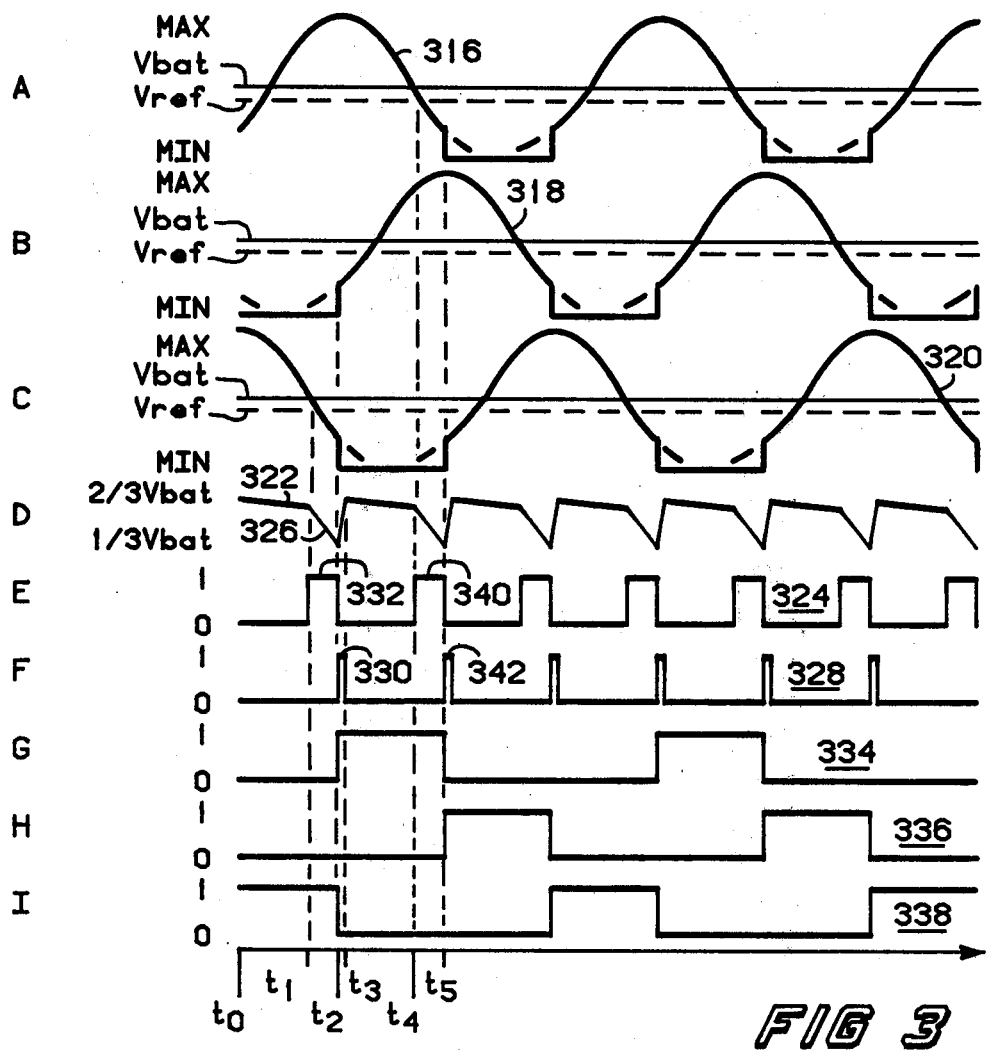
FIG. 3 illustrates waveforms useful for understanding the operation of the control circuit of the present invention during the running mode of operation.

As the rotational speed of the rotor increases, a point is reached at which the open circuit back EMF phase voltages induced across the two phase windings that are not energized reach magnitudes sufficient to forward bias at least one of the diodes 168, 170, or 172 to force the output of comparator 190 high. This provides an enabling input signal to gate 178. For example, referring now to FIG. 3, it is seen prior to time $t_0$ running speed has been obtained, that at least one of the open circuit phase voltages 316 or 320 (FIGS. 3A and 3C) induced across windings 24 and 28 are of sufficient magnitude to forward bias either diode 168 or 172 or both. Simultaneously, winding 26 is energized (FIG. 3B) which corresponds to the output of NAND gate 104, waveform 338 of FIG. 3I, being at a high level state to render transistors 112 and 20 conductive. Therefore, at time $t_0$, capacitor 80 is being discharged at a rate proportional to $I_D$ as aforedescribed (waveform portion 322 of FIG. 2D) such that the output of comparator 84 is low which produces, through gate 184, a second enabling signal at the second input to gate 178. At time $t_1$, the induced back EMF voltage across winding 28, waveform 320, which is the next phase winding to be energized has decreased to a voltage level $V_{REF}$ sufficient to cause diode 164 to be forward biased through resistors 150 and 152. This condition causes the output of run-trigger comparator 148 to go high producing trigger pulse 332 (waveform 324). Therefore, at time $t_1$ all the inputs to gate 178 are high which forces the output thereof to go low which in turn forward biases diode 180. This causes capacitor 80 to be quickly discharged, waveform portion 326 of FIG. 3D, until time $t_2$ when the potential thereacross reaches the lower threshold level forcing the output of comparator 84 to a high level state and disabling gate 178. Thereafter, diodes 96 and 180 are both reverse biased to allow charging of capacitor 80. As capacitor 80 is charged and the output of comparator 84 is forced high, clock pulse 330, waveform 328 of FIG. 3F, is produced which clocks the output of NAND gate 106 high (waveform 334 of FIG. 3G) to energized winding 28, waveform 320. Finally, as the output of NAND gate 106 is clocked high, as will be later explained, diodes 162, 164 and 166 are again reverse biased to force the output of comparator 148 low. Transition to the run mode of operation is complete then when either one of the diodes 168, 170 or 172 are forward biased by one of the open circuit phase voltage being sufficiently high to cause the output of run-trigger comparator 190 to go high and to cause run-trigger comparator 148 to supply a trigger to increment drive current to the next phase winding in synchronous with rotation of the rotor about the three phase stator.

RUN MODE OF OPERATION

The run mode of operation is based on the open circuit phase voltage of the next phase winding to be energized triggering a clock pulse to increment current drive to the particular phase winding. Since each phase winding of the stator is driven by identical circuitry, which has already been explained in some detail above, only the energizing of stator winding 24 during the run mode of operation is described hereinafter.

As explained, at time $t_2$ (FIG. 3), the output of NAND gate 106 of logic circuit 40 is clocked high (waveform 334) while the outputs of NAND gates 104 and 108 are forced low, waveforms 336 and 338 respectively. In this state, diodes 132 and 136 to decoder circuit 128 are forward biased to produce a voltage drop at nodes 142 and 144 that reverse biases diodes 162 and 164. Diode 166 is reverse biased by the open circuit phase voltage induced across winding 24. At time $t_3$, clock pulse 330 is terminated as the output of comparator 84 is forced low as capacitor 80 is charged to the upper threshold level. Thereafter, capacitor 80 is discharged at the rate proportional to current $I_D$ as aforedescribed. At time $t_4$, the voltage across stator winding 24, the next phase winding to be energized, decreases to $V_{REF}$ which forward biases diode 166. Subsequently, the output of comparator 148 is forced high to initiate trigger pulse 340, waveform 324. As the other two inputs of gate 178 are already enabled by the two high level state output signals supplied from gates 184 and comparator 190 respectively, trigger pulse 340 forces the output of gate 178 low. Diode 180 is thus forward biased to discharge capacitor 80 at a greater rate until time $t_5$, when the cap is discharged to the lower threshold level. When capacitor 80 is discharged to the lower threshold level the output of comparator 84 is again forced high disabling gate 178 and reverse biasing diode 96 to allow capacitor 80 to again be charged towards the upper threshold level and thereby initiating clock pulse 342. Clock pulse 342 causes the output of NAND gate 108 to be clocked high (waveform 336) rendering transistors 110 and 18 conducting to energize winding 24. As the output of NAND gate 108 goes high, diodes 130 and 140 are forward biased and diodes 162 and 166 are reverse biased. Since diode 164 is reverse biased by the open circuit phase voltage induced across stator winding 26 at time $t_5$ trigger pulse 340 is terminated by the output of run-trigger comparator 148 being forced low. Thereafter, winding 24 remains energized for approximately 120 electrical degrees until time $t_6$ when another clock pulse is initiated in the manner as aforedescribed.

To reduce power consumption and to protect discrete Darlington transistors 18, 20, and 22 a current limit circuit 210 is provided which senses the voltage applied at input terminal 212 that is developed across sense resistor 206 due to the current conducted therethrough as each phase winding is energized. As the sense voltage occurring at terminal 212 exceeds a reference potential supplied to the inverting input of comparator 214 (from a resistive divider network including resistors 216 and 218) the output of comparator 214 goes high. This forces the output of NOR gate 220 to go low to charge capacitor 222 through resistor 226 thereby producing a negative going voltage signal at node 230. As the input of NOR gate 228 is coupled to node 230, the negative going signal forces the output of this gate to go high to render transistor 232 conductive. This action causes one of the diodes 234, 236, or 238 to be forward biased depending upon which output of logic circuit 40 is high to steal base current from the corresponding transistor 110, 112, or 114 thereby rendering this transistor non-conducting. For example, if stator winding 24 is energized, the output of NAND gate 108 is high whereby diode 234 is rendered conductive to turn off transistors 110 and 18 when the current through resistor 206 exceeds a predetermined value. The current through stator winding 24 is then reduced to zero or some sufficiently low level for a predetermined time delay which is determined by the time that it takes for capacitor 222 to be charged back to its quiescent level state. Thereafter, the output of NOR gate 228 is forced to a low level state which turns off transistor 232 and diode 234. This allows current drive to be once again initiated through winding 24, assuming that the output of NAND gate 108 is still high. If the current through stator winding 24 should again exceed the predetermined voltage level, current limit circuit 210 would be activated to shut off current drive to transistor 110 as aforedescribed to inhibit current drive through the winding. Similarly, the current through each phase winding 26 and 28 is limited by circuit 210.

Another feature of the invention is the utilization of inhibit diodes 240 and 242 which are coupled between the collector of transistor 232 and respective outputs of comparators 190 and 148. Diodes 240 and 242 inhibit noise transients that otherwise might occur, as current drive through a particular winding is limited by the action of limiting circuit 210, from falsely triggering a clock pulse during either the start or run modes of operation of the motor.

Thus, what has been described above is a novel control circuit to provide necessary switching to the stator windings of a three phase DC brushless motor, so that a permanent magnet rotor under the influence of the stator is rotated to produce mechanical output from the motor. Synchronous operation of the motor is maintained as the control circuit senses the open circuit back EMF voltage induced across the next phase winding of the stator to trigger current drive therethrough when the magnitude of the back EMF voltage reaches a predetermined level.

We claim:

1. A control circuit for providing switching drive signals to establish synchronous phase current drive through the stator windings of a brushless direct current motor which is coupled to the control circuit, comprising:

increment drive circuit means responsive to trigger signals supplied thereto when the motor is in a run mode for producing clock pulses as well as cyclical, sequential output signals at a plurality of outputs therefrom;

switching circuit means having a plurality of inputs and outputs, each output being coupled to a respective stator winding at an output of the control circuit, said inputs being coupled with respective ones of said plurality of outputs of said increment drive circuit means, said switching circuit means being responsive to said cyclical and sequential output signals for producing the switching drive signals such that phase current is establish in a cyclical and sequential manner through the stator windings in timed relationship with the operation of the motor;

trigger circuit means which is responsive to enabling signals supplied thereto at an input thereof for producing said triggering signals, said triggering signals being supplied to an input of said increment drive circuit means; and feedback circuit means coupled between said plurality of outputs of said increment drive circuit means and each stator winding which is responsive to said sequential output signals and the EMF voltage established across the stator windings for producing said enabling signals in synchronism with the operation of the motor such that the phase current drive is established in the next succeeding stator winding in correct timed relationship.

2. The control circuit of claim 1 wherein said increment drive circuit means includes:

clock circuit means responsive to each trigger signal for incrementing one of said clock pulses thereafter at an output thereof, said output being coupled to said trigger circuit means such that the initiation of each clock pulse disables said trigger circuit means during the duration thereof; and logic drive circuit means having an input and a plurality of outputs corresponding to said plurality of output of said increment drive circuit means, said input being coupled to said clock circuit means, said logic drive circuit means being responsive to said clock pulses for producing said cyclical output signals in succession at said outputs.

3. The control circuit of claim 2 wherein:
said clock circuit means includes:
a. first current source means for supplying a first current of substantially constant magnitude;
b. second current source means for supplying a second current of substantially constant magnitude;
c. charge storage means coupled with said first and second current source means;
d. comparator circuit means coupled between said charge storage means and said output of said clock circuit means for producing said clock pulse in response to said charge storage means being charged and then discharged between an upper and lower threshold level; and
said trigger circuit means includes gate circuit means responsive to a trigger pulse being supplied to an input thereof when the motor is in a run mode of operation for causing discharge of said charge storage means to said lower threshold level wherein said charge storage means is thereafter caused to be charged toward said upper threshold level thereby initiating a next clock pulse at said output of said clock circuit means until such time that said charge storage means is charged to said upper threshold level.

4. The control circuit of claim 1 or 3 wherein said feedback circuit means includes:
decoder circuit means coupled between said outputs of said logic drive circuit means and a plurality of circuit nodes, each circuit node being coupled to a respective one of the stator windings, said decoder circuit means producing selective biasing signals that are applied to said circuit nodes in accordance with the appearance of the output signals produced at said outputs of said logic drive circuit means; and
diode circuit means which include a plurality of diodes coupled between said circuit nodes and said input of said trigger circuit means, said first diode circuit means being responsive to the selective biasing signals in conjunction with the magnitude of the back EMF induced in the next phase stator winding to be energized falling below a predetermined value for initiating an enabling signal.

5. The control circuit of claim 4 wherein said trigger circuit means includes a first comparator responsive to each enabling signal supplied thereto for producing a trigger signal.

6. The control circuit of claim 5 wherein said clock circuit means includes:
a second comparator having first and second inputs and an output, said first input being coupled to said charge storage means;
means connecting said output of said second comparator with said input of said logic drive circuit means, said first current source means, and an additional input of said gate circuit means of said trigger circuit means;
first and second serially connected resistors coupled between a first power supply conductor and a terminal at which is supplied a reference potential, the interconnection between said first and second resistors being coupled to said second input of said second comparator; and
a third resistor connected between said output and said second input of said second comparator.

7. The control circuit of claim 6 wherein said trigger circuit means includes a third comparator responsive to the motor being in a start mode of operation for disabling said gate circuit means such that said charge storage means is first charged at a first rate and then discharged at a second rate independent to the rotation of the rotor, said third comparator providing an enabling signal to an input of the gate circuit means whenever the motor is in the run mode of operation.

8. The control circuit of claim 7 wherein said clock circuit means includes variable starting frequency control circuit means coupled to said second current source means for varying the magnitude of current produced by said second current source means dependent on the magnitude of operating potential supplied to the control circuit varying between first and second levels to vary the frequency of the clock pulses as said charge storage means is discharged at varying rates as said magnitude of said second current is varied during start of the motor.

9. The control circuit of claim 8 including current limiting circuit means for sensing when the magnitude of phase drive current exceeds a predetermined value to render said switching circuit means less conductive such that said phase drive current is reduced for a predetermined time interval, thereafter said switching circuit means being allowed to be rendered conductive in response to said input signals supplied thereto from said increment circuit means.

* * * * *

UNITED STATES PATENT AND TRADEMARK OFFICE
CERTIFICATE OF CORRECTION

PATENT NO. : 4,403,177
DATED : September 6, 1983
INVENTOR(S) : Howard F. Weber

It is certified that error appears in the above-identified patent and that said Letters Patent is hereby corrected as shown below:

Claim 1, line 19, change "establish" to --established--.

Signed and Sealed this

Third Day of April 1984

[SEAL]

Attest:

GERALD J. MOSSINGHOFF

Attesting Officer

Commissioner of Patents and Trademarks